(12) United States Patent
Thurber

(10) Patent No.: US 6,196,161 B1
(45) Date of Patent: Mar. 6, 2001

(54) PET CARRIER WITH ROTATABLE CONVEX LID

(76) Inventor: Sallie Thurber, P.O. Box 8, Gilmanton Iron Works, NH (US) 03837

(*) Notice: Subject to any disclaimer, the term of this patent is extended or adjusted under 35 U.S.C. 154(b) by 0 days.

(21) Appl. No.: 09/151,561

(22) Filed: Sep. 11, 1998

(51) Int. Cl.[7] ................................................. A01K 1/00
(52) U.S. Cl. ........................................ 119/496; 119/497
(58) Field of Search .................................. 119/496, 497, 119/498, 499, 500, 501; 220/212.5, 213; 49/40

(56) References Cited

U.S. PATENT DOCUMENTS

| 180,605 | * | 8/1876 | Lee et al. ................................. 49/40 |
|---|---|---|---|
| 290,176 | | 2/1986 | Demeuse . |
| 290,178 | | 3/1985 | Nissen . |
| 294,748 | | 12/1986 | Dobelle . |
| 294,985 | | 2/1986 | Blieden . |
| 298,870 | | 5/1986 | Heisler . |
| 302,610 | | 12/1986 | Slawinski . |
| 308,429 | | 10/1988 | Van Skiver . |
| 308,588 | | 8/1987 | Goetz . |
| 310,586 | | 1/1988 | Dobelle ............................... 119/497 |
| 311,610 | | 3/1988 | Dobelle ............................... 119/497 |
| 312,333 | | 9/1987 | Van Skiver ........................... 119/496 |
| 314,251 | | 9/1987 | Van Skiver ........................... 119/496 |
| 330,443 | | 12/1990 | Darby ................................... 119/496 |
| 968,828 | * | 8/1910 | Beckley ................................. 49/40 |
| 2,522,391 | * | 9/1950 | McGonigle ......................... 220/213 |
| 3,509,855 | | 7/1967 | Priddy, Jr. ............................ 119/497 |
| 3,710,761 | | 1/1973 | Gregory ............................... 119/496 |
| 3,850,144 | | 8/1973 | Springer .............................. 119/497 |
| 3,917,789 | | 11/1975 | Heisler ................................. 24/219 |
| 4,201,153 | * | 5/1980 | Nace .................................... 119/497 |
| 4,320,849 | * | 3/1982 | Yellin .................................. 220/213 |
| 4,989,744 | | 2/1991 | Tominaga ........................... 220/835 |
| 5,503,107 | | 4/1996 | Satcher et al. ....................... 119/496 |
| 5,577,646 | * | 11/1996 | White .................................. 119/496 |
| 5,901,664 | * | 5/1999 | McKernan ........................... 119/497 |

* cited by examiner

*Primary Examiner*—Peter M. Poon
*Assistant Examiner*—Elizabeth Shaw
(74) *Attorney, Agent, or Firm*—Davis and Bujold

(57) ABSTRACT

A pet carrier with a container base (4) having a bottom surface (20), a plurality of side walls (22) that extend from the bottom surface to define a hollow interior compartment (24). A semi-cylindrical stationary convex top (6) is secured to the container base (4) so that the stationary convex top (6) partially covers the hollow interior compartment (24) to define an access opening (12) which is sized to allow a pet to pass readily therethrough. A semi-cylindrical convex lid (10) is rotatably connected to the container base (4), and the rotatable convex lid (10) is sized to completely cover the access opening (12), when rotatable convex lid (10) is in a closed position, and, when the rotatable convex lid (10) is moved to a second, open position, to allow access to the interior compartment (24).

21 Claims, 4 Drawing Sheets

PET CARRIER WITH ROTATABLE CONVEX LID

FIELD OF THE INVENTION

This invention relates to pet carriers in general and, more particularly, to pet carriers having a rotating semi-cylindrical or convex lid to allow complete access to the entire interior compartment of the pet carrier thereby facilitating easy placement of a pet into and removal of the pet from the pet carrier.

BACKGROUND OF THE INVENTION

Pet carriers, per se, are commercially available today in many shapes, sizes and forms. One of their important uses is to transport pets in a manner which is safe for the pet as well as to a pet handler. In general, pet carriers have a bottom wall, one or more rigid or flexible side walls and a top wall. An opening of some sort or a hinged door is usually provided in a side wall to allow the pet to enter into the interior of the pet carrier.

Alternatively, U.S. Pat. No. 294,985 to Blieden, U.S. Pat. No. 3,710,761 to Gregory, and U.S. Pat. No. 4,989,744 to Tominaga each disclose a pet carrier having a hinged door in the top surface thereof. However, all of these prior art pet carriers have associated shortcomings.

Pets often resist being placed into and removed from pet carriers, especially when unfamiliar with a pet handler such as a veterinarian. In the pet's efforts not to cooperate, the pet may grab onto or push away from the hinged door, a door frame, a latch or fastener, a hinge, a groove, or the like. Additionally, newborn pets pose additional problems, i.e. the pet handler may inadvertently strike the newborn against carrier structure surrounding the side door opening thereby causing injury to the young or newborn pet. Furthermore, pet carriers having a top hinged door that swings closed over the entire carrier provides a struggling pet with a wider opening in which to escape from, thereby making the pet more difficult for a handler to control. As such, a pet handler using these types of carriers with a struggling pet may result in injury to either or both the pet and the pet handler.

OBJECTS AND SUMMARY OF THE INVENTION

Wherefore, the present invention is directed towards a pet carrying container which overcomes the afore-mentioned problems and drawbacks associated with the prior art designs.

A further object of the invention is to provide a light weight and durable pet carrier which is relatively inexpensive to manufacture and relatively easy to utilize.

Another object of the invention is to provide a pet carrier which facilitates complete access to the entire interior compartment or cavity of the pet carrier from the top to facilitate readily placing a pet into and removing a pet from the pet carrier.

Another object of the invention is to provide a pet carrier with a door that allows better control over a pet's placement and removal from the pet carrier.

A still further object of the invention is to provide a pet carrier which ensures that the pet will not inadvertently fall out of or be dropped from the pet carrier during use.

Yet another object of the invention is to provide a handle mechanism which facilitates safe transport of a pet, within the pet carrier, while also acting as a second locking device for the door of a pet carrier.

Accordingly, the present invention includes a base having a rectangular bottom surface, four side walls that extend from the bottom surface to form a container defining a hollow interior compartment, and a fixed, semi-cylindrical or convex top secured to the base so that the fixed semi-cylindrical or convex top partially covers the hollow interior compartment and defines a shaped opening which is sized to allow a pet to pass readily through the shaped opening into and out of the hollow interior compartment. A semi-cylindrical lid, sized to completely cover the shaped opening, is rotatably connected to the semi-cylindrical top or base thus, allowing the lid to rotate to either an open or closed position. Preferably, the lid is releasably securable to both side surfaces of the semi-cylindrical top by a pair of securing mechanisms, which additionally serves to secure the top to the base. In this manner, the pet carrier can be easily broken down for storage or for stacking lids, tops, and bodies for more cost effective shipping.

According to one embodiment of the invention a handle is rotatably secured to the semi-cylindrical top to facilitate securing the lid in the closed position and to transport the pet carrier. Additionally, the handle is recessible in a recess provide in the top to allow the lid of the pet carrier to rotate to the open position. Additionally, the lid may be secured in the closed position by a latch mechanism provided adjacent an edge of the side wall.

Another object of the invention is to provide a pet carrier for facilitating transport of a pet, the pet carrier comprising: a container base supporting a stationary convex portion, and the container base and the stationary convex portion both defining an access opening to an internal compartment of the pet carrier to provide access thereto; a handle being connected to the pet carrier to facilitate transport of the pet carrier in a stable upright manner; a convex lid being rotatably connected to the pet carrier, the rotatable convex lid being sized to cover the access opening, when the rotatable convex lid is rotated to a closed position, and to allow access to the internal compartment via the access opening, when the rotatable convex lid is in an open position, thereby facilitating placing of a pet within the pet carrier and removing of a pet therefrom.

The present invention also relates to a method of facilitating transport of a pet in a pet carrier, comprising the steps of: supporting a stationary convex portion by a container base, and defining an access opening to an internal compartment of the pet carrier, by both the container base and the stationary convex portion, to provide access thereto; connecting a handle to the pet carrier to facilitate transport of the pet carrier in a stable upright manner; rotatably connecting a convex lid to the pet carrier, and sizing the rotatable convex lid to cover the access opening, when the rotatable convex lid rotated to a closed position, and to allow access to the internal compartment via the access opening, when the rotatable convex lid is in an open position, thereby facilitating placing of a pet within the pet carrier and removing of a pet therefrom; placing a pet in the pet carrier; and transporting the pet to a desired location.

Other objects of the invention will be further understood with reference to the following description and the accompanying drawings. Additionally, it is to be appreciated that the particular pet carrier embodying the present invention is shown by way of illustration only and not as a limitation of the invention. The principles and features of this invention may be employed in varied and numerous embodiments without departing from the scope of the invention.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
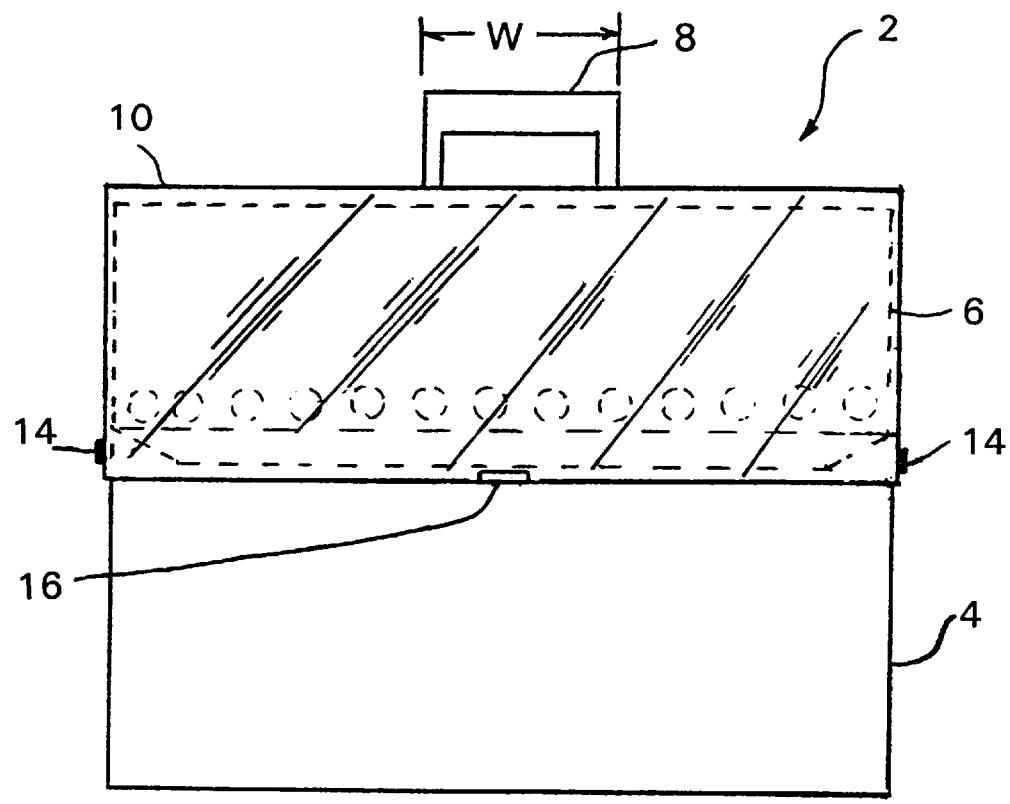
FIG. 1 is a diagrammatic front elevational view of a pet carrier, made in accordance with the present invention, with the lid shown in a closed position.
Figure 2:
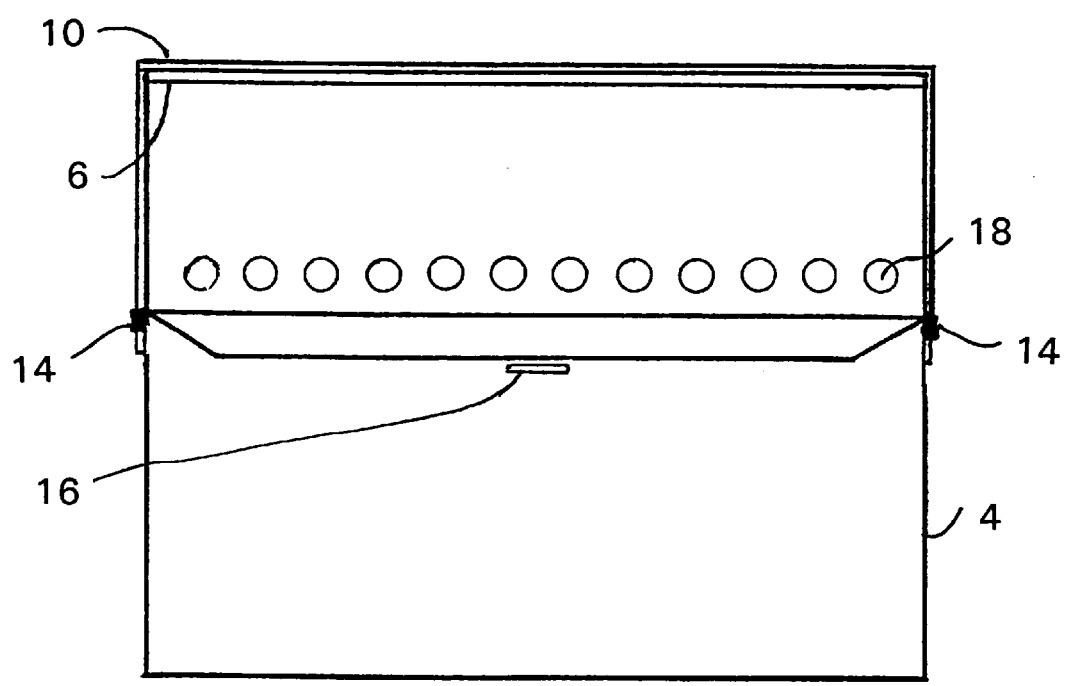
FIG. 2 is a diagrammatic front elevational view of the pet carrier, made in accordance with the present invention, with the lid shown in the open position.

Referring to FIGS. 1–5, the pet carrier 2 generally includes a generally rectangular-shaped container base 4, a stationary, generally semi-cylindrically shaped convex top 6, a handle 8 pivotally connected to the pet carrier 2, preferably pivotally connected to an exterior surface of the stationary convex top 6, and a generally semi-cylindrical shaped convex lid 10 rotatably connected with the container base 4 and/or stationary convex top 6. The stationary convex top 6 has a semi-cylindrical exterior surface 7 and a similar mating or matching semi-cylindrical interior surface 9. A base perimeter section of the stationary convex top 6 is sized to mate smoothly with a perimeter section of an open end of the container base 4 to form an interior compartment 24 which can be accessed by an access opening 12 (see FIG. 4).

Figure 6B:
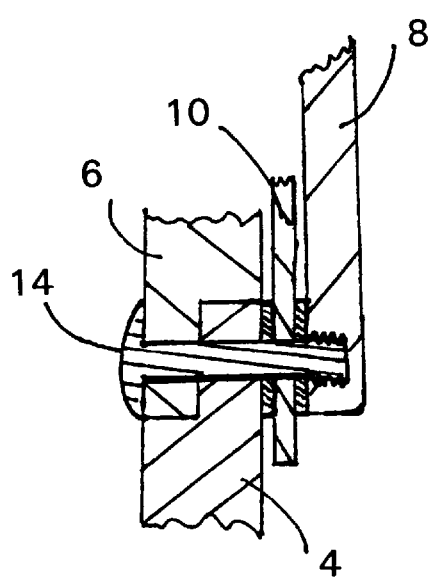
FIGS. 6a and 6b are diagrammatic sectional views of an embodiment of the securing mechanism of the invention.
Figure 6A:
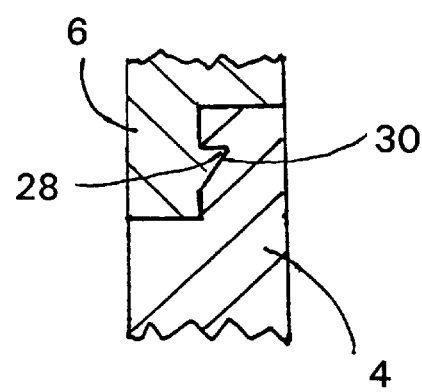

Preferably, the stationary convex top 6 smoothly mates with the container base 4 and is secured in place by a partial perimeter lip 28, provided on a perimeter section of the stationary convex top 6, which mates or engages with a mating partial perimeter notch 30, provided on a perimeter section of the container base 4, or vice versa (See FIG. 6a). Alternatively, the stationary convex top 6 can be releasably secured to the container base 4 by a conventional pair of mating partial perimeter recesses and protrusions provided on both a bottom perimeter surface of the stationary convex top 6 and on a mating top perimeter surface of the container base 4.

A pair of removable securing mechanisms 14 extend through a portion of the overlapped perimeter lip 28, of the stationary convex top 6, and the perimeter notch 30, of the container base 4, to retain the engagement between those two components with one another (similar to the arrangement of FIG. 6B but not specifically shown in the drawings). This feature allows ease of assembly and facilitates stacking of the container bases 4, the stationary convex tops 6, and the rotatable convex lids 10 for more cost effective method of shipping or transportation of the pet carrier 2 in an unassembled state. Alternatively, the stationary convex top 6 may be molded with, glued to or otherwise permanently secured to the container base 4.

The rotatable convex lid 10 is rotatably secured to the stationary convex top 6 and/or the container base 4 by the same pair of securing mechanisms 14. The rotatable convex lid 10 is similarly shaped to but is slightly larger in size than the stationary convex top 6. Due to this arrangement, the rotatable convex lid 10 is sized to completely cover the access opening 12 of the pet carrier 2 while still being able to rotate over and be positioned in an overlapped position adjacent the stationary convex top 6, i.e. to a retracted position. In this manner, the rotatable convex lid 10 may be rotated to a closed position (see FIGS. 1 and 3) or to an open position (see FIGS. 2 and 4) as desired.

The rotatable convex lid 10 is preferably releasably secured in the closed position by a conventional latching mechanism 16 with a first latching member 15, of the latching mechanism 16, being supported by an exterior surface of the container base 4 and a mating second latching member 17, of the latching mechanism 16, being supported by an inwardly facing surface of the rotatable convex lid 10.

The first latching member 15 can be, for example, a protruding lip, provided on one of the container base 4 or on the rotatable convex lid 10, that is biased, due to the inherent elasticity of the material from which the pet carrier is manufactured, into the mating second latching member 17, e.g. a mating notch, provided on the other of the container base 4 or on the rotatable convex lid 10.

As seen in FIGS. 1 through 4, a plurality of ventilation apertures 18 are formed in the container base 4 and/or the stationary convex top 6 and/or the rotatable convex lid 10 so that a pet, contained within the carrier, is able to readily receive fresh air from the exterior environment. The ventilation apertures 18 should be of a small enough size to prevent any unwanted escape of a pet from the pet carrier 2 as well as to prevent any unwanted harm to a pet being carried by the pet carrier 2. Also, it is to be appreciated that these ventilation apertures may have various shapes, sizes or configurations so long as the ventilation apertures do not provide the pet with a convenient paw grip that would make placement of the pet into the carrier or removal therefrom more difficult.

Figure 3:
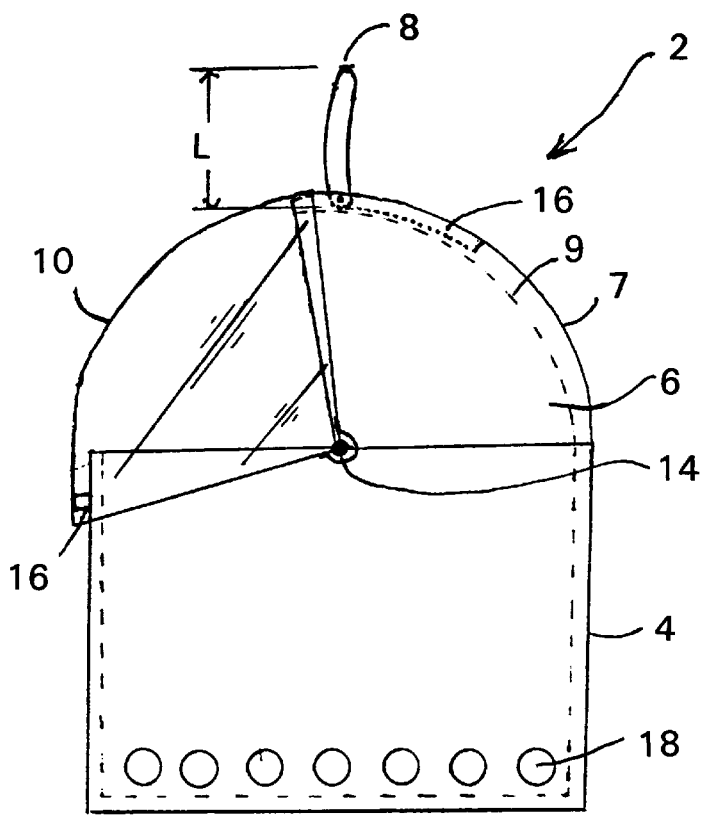
FIG. 3 is a diagrammatic side view of the pet carrier of FIG. 1 with the lid shown in the closed position.
Figure 4:
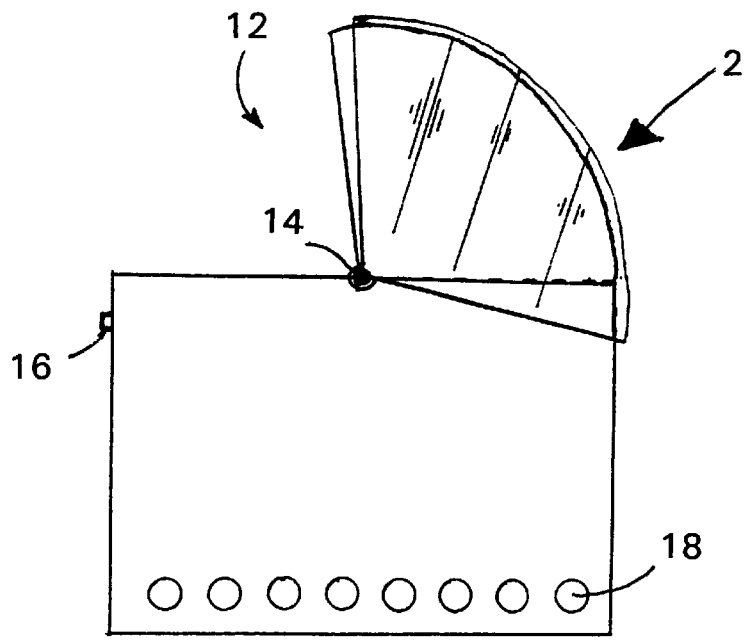
FIG. 4 is a diagrammatic side view of the pet carrier of FIG. 2 with the lid shown in the open position.

Referring now to FIGS. 1, 3 and 4, the handle 8 is a rigid, C-shaped, elongate member having a width W of about two to fifteen inches or so, preferably about two to five inches or so, and a leg length L of about one to six inches or so, preferably about two to four inches or so. The handle 8 is pivotally attached to a central exterior surface of the stationary convex top 6, or opposed side surfaces of the container base 4 (FIG. 6b), and has both an "in use substantially vertical position" (FIGS. 1 and 3) and a "stowed position" in which the handle 8 is pivoted into a cavity 19 formed in the stationary convex top 6. This provides clearance for the rotatable convex lid 10 (FIGS. 2 and 4) to rotate from its open position to its closed position and vice versa without hinderance from the handle 8. Alternatively, if the handle 8 is attached to opposed sides of the container base 4 (as shown in FIG. 6B), sufficient clearance is provided for the rotatable convex lid 10 so that a "stowed position" for the handle 8 may not be necessary. Preferably, the handle 8 is able to rotate about 90 to 110 degrees or so, relative to the stationary convex top 6, and the cavity 19 is deep enough to stow the handle 8 so that the rotatable convex lid 10 may freely rotate over both the handle 8 and the stationary convex top 6 to either one of its two positions, but not so deep so as to significantly detract from the usable space of the interior compartment 24.

As shown in FIG. 1, the handle 8 has two parallel but spaced apart legs 11 which have a curvature similar or identical to that of the curvature of the stationary convex top 6 to facilitate easy stowage of the handle 8 in the cavity 19 while occupying as small a space as possible, i.e. the cavity 19 has a minimal depth which extends into the interior compartment of the pet carrier 2. This arrangement assists with maintaining the space of internal compartment as large as possible.

It is to be appreciated that the handle 8 is secured to the stationary convex top 6, or the container base 4, at locations that allow the pet carrier 2, when the rotatable convex lid 10 is in its closed position and when the pet carrier 2 is lifted for transport by a user, to remain in a stable upright position without flipping over. That is, the handle 8 is preferably centered with respect to the pet carrier 2 and attached well above the center of gravity of the pet carrier 2 so that the pet carrier 2 always remains in a stable upright orientation, e.g. FIG. 3, even if the pet moves inside the pet carrier during transport. Furthermore, it is to be appreciated that the handle 8 may be locked in its upright vertical position, by passing over or engaging with a conventional notch or detent (not shown in detail), to temporarily maintain the handle 8 in its upright vertical position. The handle 8, in the embodiment shown in FIGS. 1 and 3, thus prevents inadvertent movement of the rotatable convex lid 10 from its closed position and thus locks the rotatable convex lid 10 in that position. This arrangement provides an additional locking feature for the rotatable convex lid 10 in the event that the latch mechanism 16 fails for some reason.

Alternatively, the handle 8 may be manufactured of sufficient size to have a width which is slightly wider than both the stationary convex top 6 and the rotatable convex lid 10 so the legs of the handle 8 may be connected to the pet carrier 2 by the same pivot members 14 which secure the rotatable convex lid 10 to the container base 4, as shown in FIG. 6B.

Figure 5:
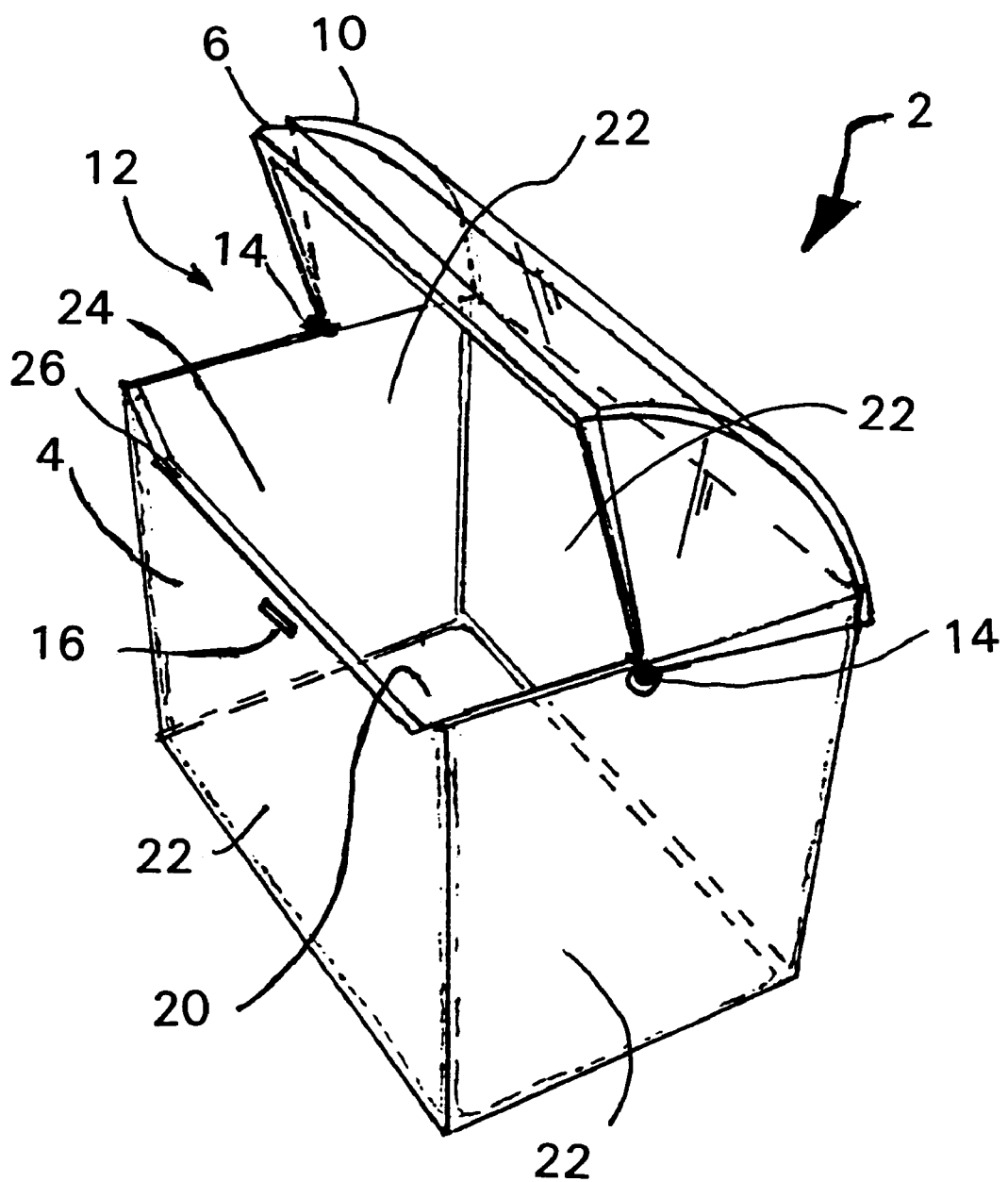
FIG. 5 is a diagrammatic perspective view of the pet carrier of FIG. 1 shown in the open position.

As seen in FIG. 5, the pet carrier of FIG. 1 is shown in an open position. The container base 4 has a planar bottom wall 20, to facilitate placing of the pet carrier 2 on a flat support surface, such as a table, chair, desk, floor, etc., and four contiguous planar side walls 22 that extend substantially perpendicular to and from the bottom wall 20 to define a major area of the interior compartment 24.

The access opening 12 is preferably about the same size as the bottom wall 20 so that when the rotatable convex lid 10 is in its open position, the interior compartment 24 is substantially fully exposed and accessible to a user. Additionally, one of the side walls 22, the side wall adjacent the access opening 12, has a partially removed surface or edge 26 (FIG. 2), extending substantially parallel to the bottom wall 20 but spaced therefrom, to allow an arm and/or hand of the pet handler to more ergonomically access the interior compartment 24 through the access opening 12. Such contoured configuration accordingly affords a pet handler with complete visual and easier physical access to the entire interior compartment through the access opening 12.

As the stationary convex top 6 is of a semi-cylindrical shape, the stationary convex top 6 serves to restrict the escape routes of a pet once placed in the interior compartment 24 of the pet carrier 2, thus allowing a pet handler to more easily close off, with one or both hands of the handler, the access opening 12 which is the primary escape route. Furthermore, because the pet carrier 2 is substantially a top loading carrier, with full access being provided to the interior compartment 24 from the top, placement of a pet into or removal of the pet from the pet carrier 2 is easier since there are fewer surfaces which a pet can claw either to get out of or to remain within the pet carrier 2. Moreover, a pet carrier with a top loading feature ensures that the pet will not inadvertently fall out of or be dropped from the pet carrier during transportation.

Preferably, the container base 4, the stationary convex top 6, and the rotatable convex lid 10 are made of injection molded plastic to produce an economical container that is light weight and durable and relatively inexpensive to manufacture.

The rotatable convex lid 10 is preferably manufactured from a transparent or a translucent plastic material in order to facilitate viewing of the pet while in the pet carrier 2 and when the rotatable convex lid 10 is in its closed position.

The internal compartment of the pet carrier 2 preferably has a size of 900 to about 7000 cubic inches, more preferably a size of 2500 to about 5000 cubic inches, and most preferably a size of about 3700 cubic inches.

It is to be appreciated that the overall shape and size of the container base 4 can vary from application to application. The important aspect of the present invention is that there is a stationary, convex top lid which facilitates movement of a rotatable convex lid to provide both access to the interior compartment and closing of access to the interior compartment.

Although the pet carrier of the present invention has been shown as having an opening 12 substantially the same size as the bottom wall 20, one of ordinary skill in the art will appreciate that an opening 12 being substantially larger than the bottom wall 20 could be provided without departing from the spirit and scope of the invention. For example, the side wall 22 adjacent the opening 12 could be disposed at an angle away from the bottom wall 20, with the remaining side walls and covers being correspondingly dimensioned to engage the sloping side wall. Thus, a pet handler would have further enhanced access to the pet carrier 2. Of course, one would still have to ensure that the center of gravity is such that the pet carrier would not tip over. To further this, the bottom wall 20 could be counterweighted via an increased material thickness or the like.

Since certain changes may be made in the above described pet carrier, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A pet carrier for facilitating transport of a pet, the pet carrier comprising:

a container base supporting a stationary convex portion, and the container base and the stationary convex portion both defining an access opening to an internal compartment of the pet carrier to provide access thereto;

a handle being permanently connected to the stationary convex portion of the pet carrier, at a location remote from a perimeter of the base container, to facilitate transport of the pet carrier in a stable upright manner;

a convex lid being rotatably connected to the container base, the rotatable convex lid being sized to cover the access opening, when the rotatable convex lid is moved to a closed position, and to allow access to the internal compartment via the access opening, when the rotatable convex lid is moved an open position, thereby facilitating placing of a pet within the pet carrier and removing of a pet therefrom.

2. The pet carrier according to claim 1, wherein the handle is pivotally connected to the stationary convex portion, and the stationary convex portion is provided with a cavity to accommodate the handle and facilitate uninhibited movement of the rotatable convex lid, relative to the stationary convex portion, when the rotatable convex lid is moved to and from the open position.

3. A pet carrier for facilitating transport of a pet, the pet carrier comprising:

a container base supporting a stationary convex portion, and the container base and the stationary convex portion both defining an access opening to an internal compartment of the pet carrier to provide access thereto;

a handle being connected to the pet carrier to facilitate transport of the pet carrier in a stable upright manner;

a convex lid being rotatably connected to the container base, the rotatable convex lid being sized to cover the access opening, when the rotatable convex lid is moved to a closed position, and to allow access to the internal compartment via the access opening, when the rotatable convex lid is moved to an open position, thereby facilitating placing of a pet within the pet carrier and removing of a pet therefrom; and the handle being pivotally connected to the stationary convex portion, and the stationary convex portion being provided with a cavity to accommodate the handle and facilitate uninhibited movement of the rotatable convex lid, relative to the stationary convex portion, when the rotatable convex lid is moved to and from the open position;

wherein the handle is provided with a pair of spaced apart legs which have curvature similar to the curvature of the convex portion to facilitate storage of the handle within the cavity.

4. The pet carrier according to claim 3, wherein the handle is attached to the stationary convex portion at location such that the pet carrier always remains in an upright orientation during transport of the pet carrier even when a pet is located within the interior compartment.

5. The pet carrier according to claim 4, wherein the handle is provided with a locking mechanism to provide a secondary lock for maintaining the rotatable convex lid lock in the closed position.

6. The pet carrier according to claim 5, wherein the handle and the rotatable convex lid are both attached to the pet carrier via common pivoting and securing device.

7. The pet carrier according to claim 1, wherein the rotatable convex lid is manufactured from a material which is one of transparent and translucent.

8. The pet carrier according to claim 7, wherein the stationary convex portion and the rotatable convex lid both have partial semi-cylindrical shapes, with the rotatable convex lid being larger than the stationary convex portion, to facilitate relative movement with respect to one another.

9. The pet carrier according to claim 8, wherein a plurality of ventilation holes are provided in one of the container base, the stationary convex portion, and the rotatable convex lid to facilitate breathing of a pet therein.

10. The pet carrier according to claim 1, wherein the stationary convex portion is permanently secured to the container base.

11. The pet carrier according to claim 1, wherein the stationary convex portion is removably secured to the container base.

12. The pet carrier according to claim 1, wherein the rotatable convex lid is pivotally attached to the container base via a pair of opposed securing mechanisms which facilitate pivoting movement of the handle.

13. The pet carrier according to claim 12, wherein a first latching member, of a latching mechanism, is supported by the container base and a second mating latch member, of the latching mechanism, is supported by the rotatable convex lid and mating engagement of the first and second mating latch members secure the rotatable convex lid in the closed position.

14. The pet carrier according to claim 1, wherein the handle has a substantially vertical in use position and a second stowed position in which the handle is clear of a rotating path of the rotatable convex lid.

15. The pet carrier according to claim 14, wherein the container base has a planar bottom wall to facilitate support of the pet carrier on a desired surface.

16. A method of facilitating transport of a pet in a pet carrier, comprising the steps of:

attaching a stationary convex portion to a container base, and defining an access opening to an internal compartment of the pet carrier, by both the container base and the stationary convex portion, to provide access thereto;

permanently connecting a handle to the stationary convex portion of the pet carrier, at a location remote from the base container, to facilitate transport of the pet carrier in a stable upright manner;

rotatably connecting a convex lid to the pet carrier, and sizing the rotatable convex lid to cover the access opening, when the rotatable convex lid moved to a closed position, and to allow access to the internal compartment via the access opening, when the rotatable convex lid is moved to an open position, thereby facilitating placing of a pet within the pet carrier and removing of a pet therefrom;

placing a pet in the pet carrier; and transporting the pet to a desired location.

17. The method according to claim 16, further comprising the step of pivotally connecting the handle to the stationary convex portion, and providing the stationary convex portion with a cavity to accommodate the handle and facilitate uninhibited movement of the rotatable convex lid, relative to the stationary convex portion, when the rotatable convex lid is moved to and from the open position.

18. The method according to claim 16, further comprising the step of pivotally attaching the rotatable convex lid to the container base via a pair of opposed securing mechanisms which also facilitate pivoting movement of the handle.

19. The method according to claim 16, further comprising the step of supporting a first latching member, of a latching mechanism, by the container base and supporting a second mating latch member, of the latching mechanism, by the rotatable convex lid and mating engagement of the first and second mating latch members securing the rotatable convex lid in the closed position.

20. The method according to claim 16, further comprising the steps of providing a plurality of ventilation holes in one of the container base, the stationary convex portion, and the rotatable convex lid to facilitate breathing of a pet when located therein; and permanently securing the stationary convex portion to the container base.

21. The method according to claim 17, further comprising the step of providing the handle with a pair of spaced apart legs which have curvature similar to the curvature of the convex portion to facilitate storage of the handle within the cavity.

* * * * *